United States Patent [19]
Nakano

[11] Patent Number: 5,675,242
[45] Date of Patent: Oct. 7, 1997

[54] SEMICONDUCTOR INTEGRATED CIRCUIT

[75] Inventor: Toshiya Nakano, Tokyo, Japan

[73] Assignee: Mitsubishi Denki Kabushiki Kaisha, Tokyo, Japan

[21] Appl. No.: 675,293

[22] Filed: Jul. 1, 1996

[30] Foreign Application Priority Data

Nov. 13, 1995 [JP] Japan ................... 7-294281

[51] Int. Cl.$^6$ ..................... G05F 3/08; G05F 3/26; B60R 21/32
[52] U.S. Cl. ................... 323/312; 323/315; 307/10.1; 280/734
[58] Field of Search ..................... 323/312, 315, 323/316, 317; 307/9.1, 10.1; 280/734, 735

[56] References Cited

U.S. PATENT DOCUMENTS

| | | | |
|---|---|---|---|
| 4,914,317 | 4/1990 | Agiman | 307/270 |
| 5,158,323 | 10/1992 | Yamamoto et al. | 280/734 |
| 5,262,713 | 11/1993 | Agiman | 323/315 |
| 5,311,065 | 5/1994 | Kondo | 307/10.1 |
| 5,339,019 | 8/1994 | Benz | 323/286 |
| 5,442,244 | 8/1995 | Furui | 307/10.1 |
| 5,465,041 | 11/1995 | Sanders et al. | 323/312 |

*Primary Examiner*—Adolf Berhane

[57] ABSTRACT

A semiconductor integrated circuit is disclosed in which a power MOSFET supplies a squib of automobile air bag systems with load current. The power MOSFET $Q_1$ provides squib $Z_L$ with the load current, and load current signal which outputs from shunt resistor $R_s$ is provided an operational amplifier consisting of transistors $Q_4$–$Q_{10}$ with a negative feedback signal, so that the load current to be supplied to the squib $Z_L$ is restricted. The negative feedback operation is interrupted by load current function interruption signal which inputs to terminal $T_6$. A circuit which consists of two current mirror circuits composed of transistors $Q_4$–$Q_{10}$ and constant current source $I_4$ supplies the operational amplifier with constant current to interrupt the feedback operation.

14 Claims, 8 Drawing Sheets

SEMICONDUCTOR INTEGRATED CIRCUIT

FIELD OF THE INVENTION

This invention relates to a semiconductor integrated circuit, and more specifically, relates to a semiconductor integrated circuit which is employed in automobile air bug systems and the like.

DESCRIPTION OF THE PRIOR ART

Recently, automobile air bag systems tend to be installed in more and more automobiles, in which the air bag is adapted to expand automatically as soon as collision accident takes place, and protects driver or crew in the collided automobile. In such air bag systems, when an impact which exceeds a predetermined level is applied to automobile body, an acceleration sensor detects the impact, and expands the air bag by causing an electric current to flow through an initiating explosive (called "squib") for an explosive compound to ignite it.

Figure 6:
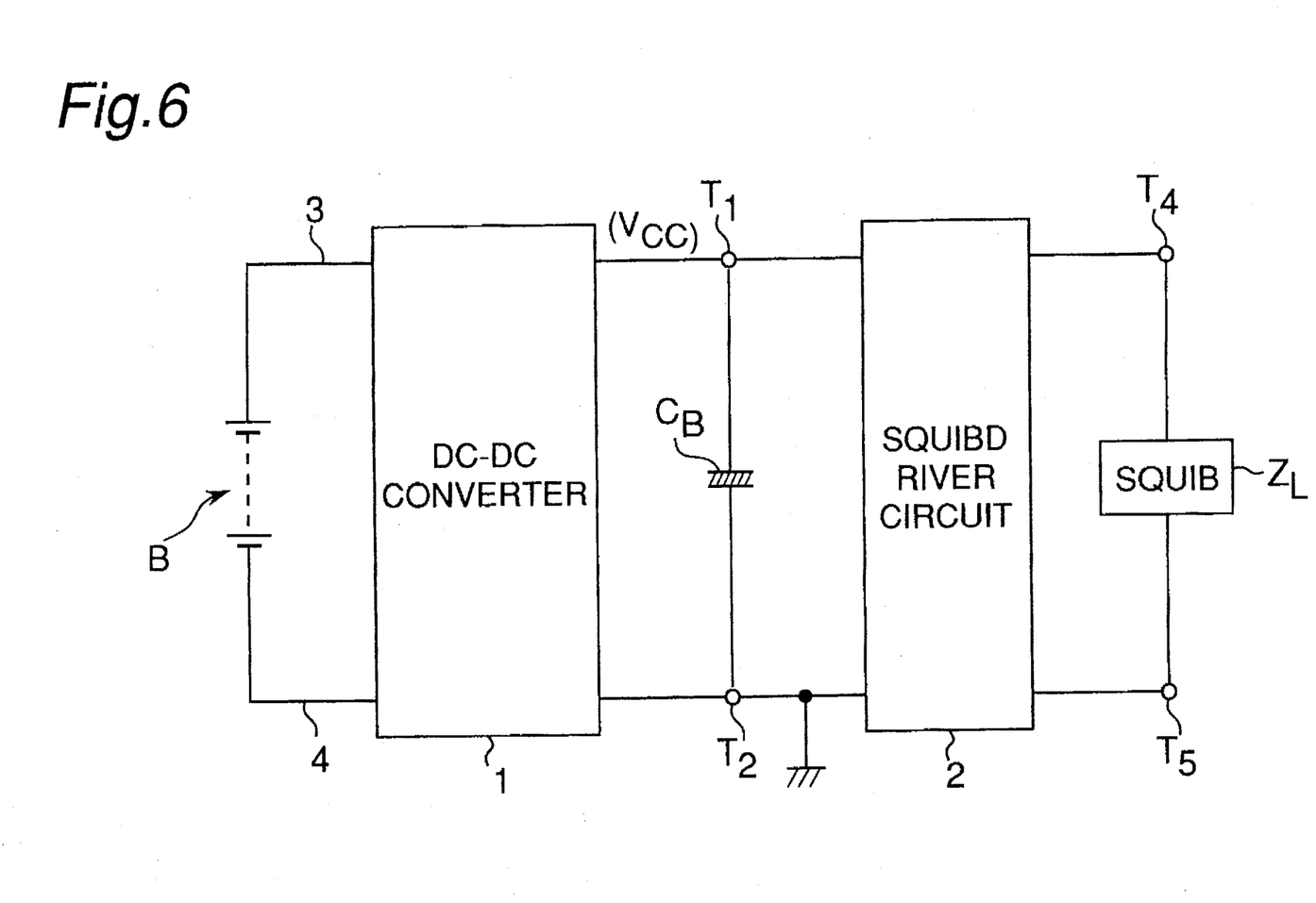
FIG. 6 is a schematic system block diagram of an automobile air bag system.

Such air bag systems, as shown in FIG. 6, consist of DC-DC converter 1 which steps up output voltage of battery B installed in an automobile up to a predetermined voltage, capacitor $C_B$ with large capacitance connected between output terminals $T_1$ and $T_2$ of the DC-DC converter 1, and squib driver circuit 2, with a squib $Z_L$ being connected between the output terminals $T_4$ and $T_5$ as a load of the squib driver circuit 2. The DC-DC converter 1 and the squib driver circuit 2 are integrated into the same integrated circuit.

In FIG. 6, the capacitor $C_B$ with large capacitance connected between the output terminals $T_1$ and $T_2$ is always charged to an output voltage $V_{CC}$ of the DC-DC converter 1 while the automobile is in operation. Accordingly, even if the battery B is destroyed or power supply lines 3, 4 from the battery B to the DC-DC converter 1 are cut off by an accident, electric charge which is charged in the capacitor $C_B$ discharges through the squib driver circuit 2, and the capacitor $C_B$ can supply the squib driver circuit 2 with power. Namely, the capacitor $C_B$ functions as a backup battery for the squib driver circuit 2.

Incidentally, in such air bag systems, the squib driver circuit 2 is required to flow, through the squib $Z_L$, current more than a certain predetermined amount for at least a predetermined period. However, when the squib driver circuit 2 supplies the squib $Z_L$ with current without any limitation, the output voltage of capacitor $C_B$ as the backup power supply will drop in a short period of time. Accordingly, when a current over predetermined level flows through the squib $Z_L$, it becomes necessary to make the voltage drop delay by limiting the load current.

Figure 7:
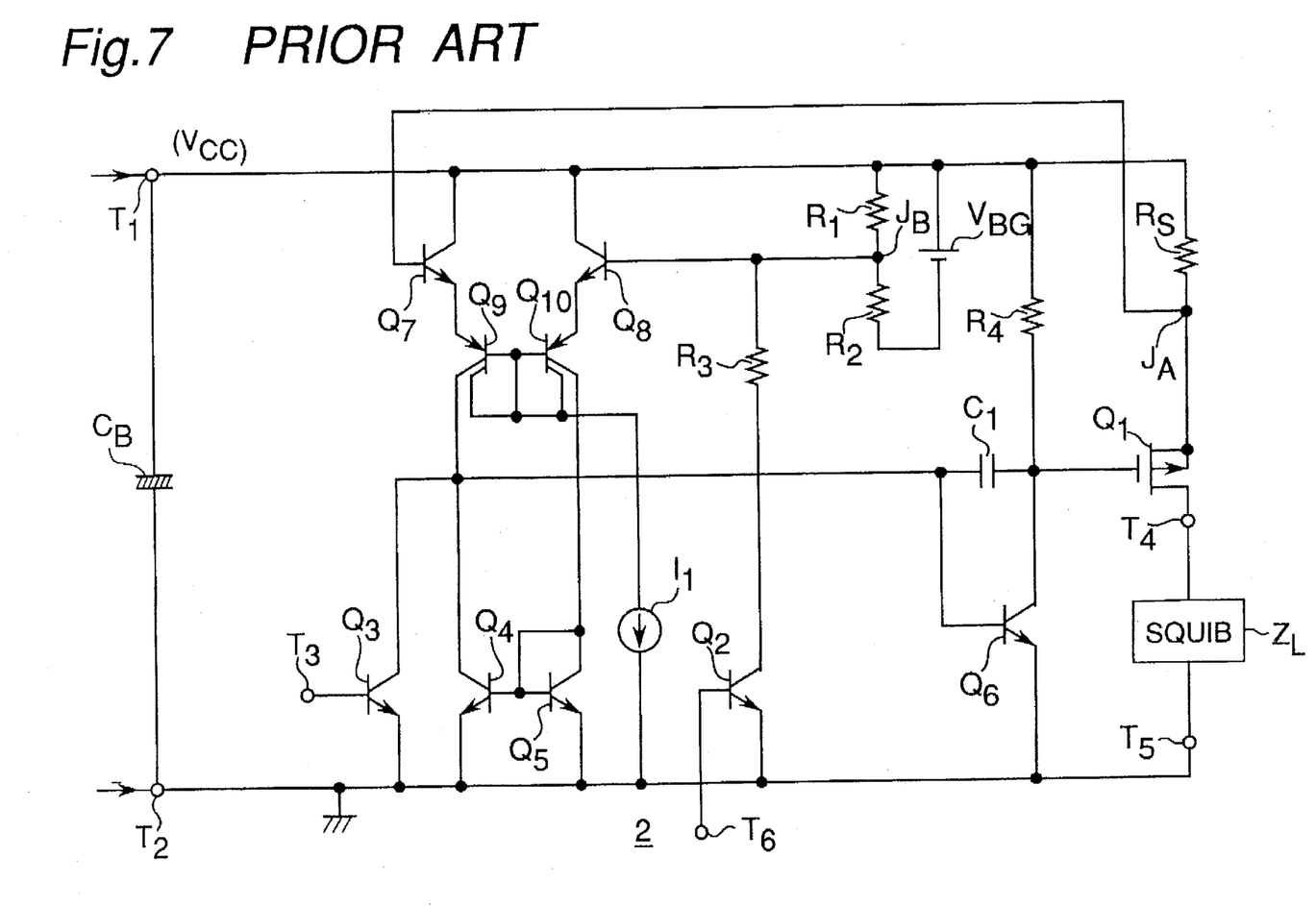
FIG. 7 is a circuit diagram of an prior squib driving circuit in an automobile air bag system.

FIG. 7 shows an example of such squib driver circuit with the load current limit function. In FIG. 7, transistor $Q_1$ is a P-channel power MOSFET which controls a current supplied to the squib $Z_L$. Transistors $Q_4$–$Q_{10}$ constitute an operational amplifier together with constant current source $I_1$, resistors $R_1$, $R_2$, $R_4$ and capacitor $C_1$. The transistor $Q_1$ constitutes a power amplifying stage in the operational amplifier. Gate of the transistor $Q_1$ is connected to collector of the transistor $Q_6$ in the operational amplifier, shunt resistor $R_S$ is connected between source of the transistor $Q_1$ and the power supply $V_{CC}$. And the squib $Z_L$ is connected between an output terminal $T_4$ connected to drain of the transistor $Q_1$ and another output terminal $T_5$ connected to the ground. Base of the transistor $Q_7$ in the operational amplifier is connected to node $J_A$ between source of the transistor $Q_1$ and the shunt resistor $R_S$. Base of the transistor $Q_8$ is connected to node $J_B$ between the resistors $R_1$ and $R_2$ which are connected to power supply $V_{BG}$ in parallel.

The transistor $Q_3$ has its collector connected to collector of the transistor $Q_4$ in the operational amplifier. The transistor $Q_3$ has its base connected to collision sense signal input terminal $T_3$, and its emitter connected to the ground. Resistor $R_3$ is connected between base of the transistor $Q_8$ in the operational amplifier and collector of the transistor $Q_2$. The transistor $Q_2$ has its base connected to input terminal $T_6$ to which is supplied a signal for canceling load current limit function, and its emitter connected to the ground. A circuit consisting of the transistor $Q_2$ and the resistor $R_3$ constitutes a load current limit function cancel circuit for canceling the current limit function in the squib driver circuit 2.

Figure 8:
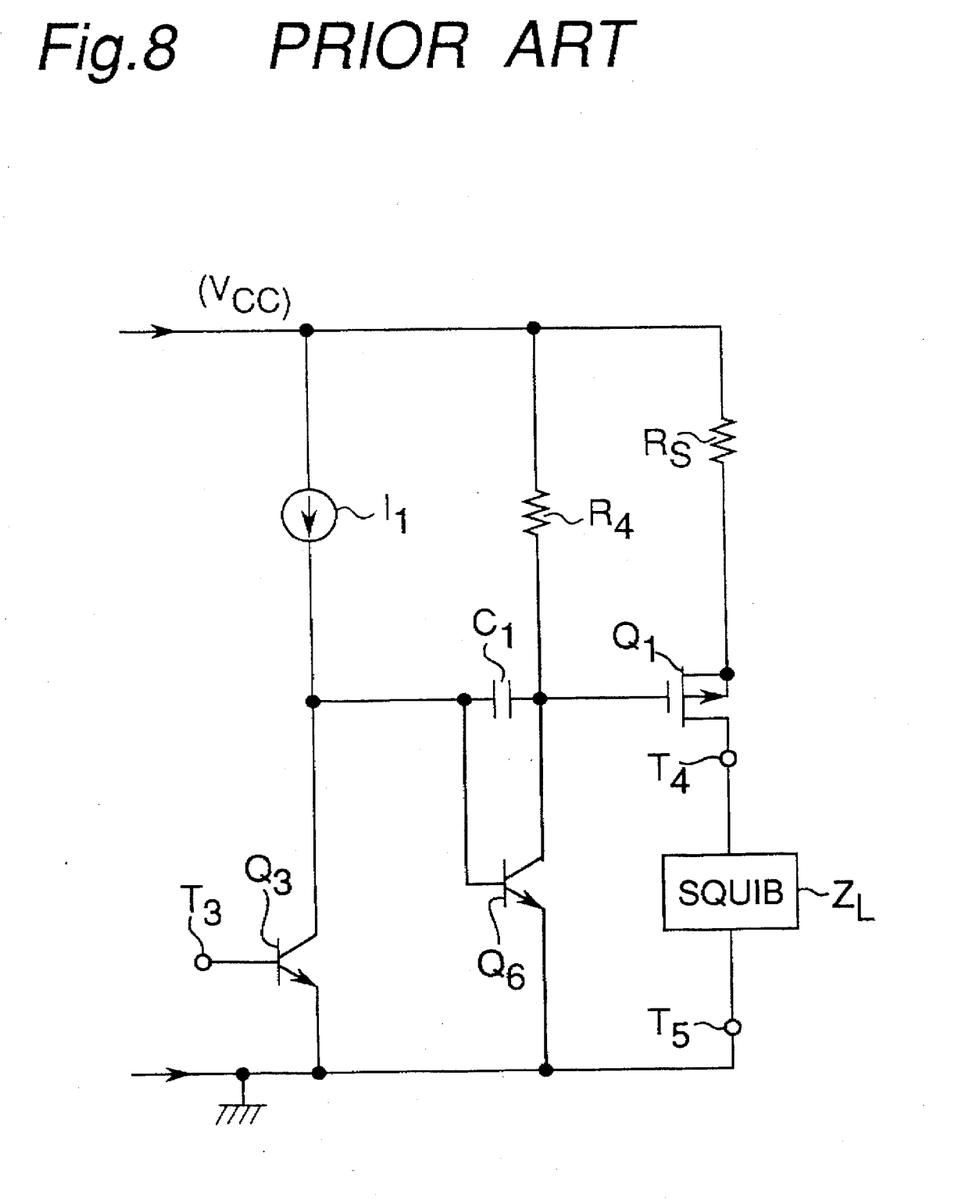
FIG. 8 is a drawing for describing the operation of the squib driving circuit of FIG. 7.

The squib driver circuit 2 operates as follows. First of all, assume that the transistor $Q_2$ and the resistor $R_3$ are not present. When the transistor $Q_1$ is OFF, the potential on node $J_A$ is equal to the potential $V_{cc}$ of power supply line, and the potential on node $J_B$ is equal to reference potential $V_{REF}$ which is determined in accordance with the power supply $V_{BG}$ and the resistors $R_1$, $R_2$. Consequently, the base potential in transistor $Q_7$ is higher than the base potential of the transistor $Q_8$, and the operational amplifier do not operate as a negative feedback amplifier, but operate as a comparator. Accordingly, when the transistor $Q_1$ is OFF, the squib driver circuit 2 shown in FIG. 7 is equivalent to a circuit shown in FIG. 8, and the operational amplifier operates only as a constant current load for the transistor $Q_3$. Namely, when the potential on collision sense signal input terminal $T_3$ is in logical high (hereinafter referred to as "H") and the base potential in transistor $Q_3$ is "H" so that the transistor $Q_3$ is switched on, the transistor $Q_6$ is switched off, with the result that the P-channel transistor $Q_1$ also turns off and current does not flow through squib $Z_L$.

Under the above circumstances, when the potential on the collision sense signal input terminal $T_3$ has switched to logical low (hereinafter referred to as "L"), the P-channel transistor $Q_1$ turns on so that current flows through the squib $Z_L$. When the current flows through the squib $Z_L$, the current also flows through the current sense resistor $R_S$ called shunt resistor, the potential $V_A$ on node $J_A$ decreases from the power supply potential $V_{CC}$. When the potential $V_A$ on node $J_A$ drops approximately to the reference potential $V_B$ on node $J_B$, and further the potential $V_A$ drops to a lower potential than the potential $V_B$, the operational amplifier enters into its linear operation region. As a result, the operational amplifier operates as a negative feedback amplifier and a base current in transistor $Q_6$ may decrease.

As stated above, when the base current in transistor $Q_6$ decreases, it becomes difficult for this transistor $Q_6$ to drive the load resistor $R_4$ sufficiently, and the collector potential in transistor $Q_6$ increases. Thus, the gate potential in transistor $Q_1$ whose gate is connected to collector of the transistor $Q_6$ begins to increase, and the current which flows through the P-channel transistor $Q_1$ is limited. Thus, potential difference between source of the transistor $Q_1$ and drain thereof increases, and the voltage applied to the squib $Z_L$ decreases.

When the current which flows through the transistor $Q_1$ is limited, the potential difference between drain of the transistor $Q_1$ and source thereof increases, and a power loss in the transistor $Q_1$ increases abruptly. When the power loss exceeds a standard value for the transistor $Q_1$, there is a possibility that the power transistor $Q_1$ may be destroyed.

Thus, in the squib driver circuit 2 shown in FIG. 7, until the power supply voltage $V_{CC}$ decreases to be equal to or lower than a predetermined value $V_{LC}$, the potential on input terminal $T_6$ for canceling the load current limit function is made logical "H" to switch on the transistor $Q_2$ and to decrease the potential $V_B$ on node $J_B$ from the reference potential $V_{REF}$. As a result, even though the current supplied from the transistor $Q_1$ to the squib $Z_L$ becomes larger than the predetermined value $I_{CL}$, the current which flows through the transistor $Q_1$ is not limited, and the power loss in the transistor $Q_1$ becomes smaller. After that, when the power supply voltage $V_{CC}$ has decreased to the value $V_{CL}$, the potential of control signal input terminal $T_6$ is made logical "L" and the transistor $Q_2$ is switched off. Thus, the current in the transistor $Q_1$ is limited as stated above. Then, because the power supply voltage $V_{cc}$ has decreased, a potential difference between source of the transistor $Q_1$ and drain thereof is trivial, and the power loss in transistor $Q_1$ is comparatively small.

Incidentally, in the prior squib driver circuit 2 in FIG. 7, when the transistor $Q_2$ switches on and the current restriction is removed, a current flows through the resistances $R_1$, $R_3$ and transistor $Q_2$ from the power supply $V_{CC}$ to the ground, and the current consumption in the squib driver circuit 2 increases. The above increase in the current consumption is substantially determined by the power supply voltage $V_{CC}$ and the resistances $R_1$, $R_3$. Now, on the assumption that $V_{CC}$=20 volts, $R_1$=5 kilo-ohms, and $R_3$=15 kilo-ohms, the above increase in the current consumption is about 1 milli-ampere in accordance with $V_{CC}/(R_1+R_3)$.

As stated above, when the current consumption in the squib driver circuit 2 increases, the voltage in capacitor $C_B$ which acts as a backup power supply in air bag system, that is, the power supply voltage $V_{CC}$ for the squib driver circuit 2 decreases fast to that extent.

Although the increase of current consumption in the squib driver circuit 2 can be limited to small if the values of the resistors $R_1$, $R_3$ are made large, it is disadvantageous to make resistance in these resistors large for chip size in an integrated circuit. Furthermore, the voltage drop in the resistor $R_1$ become large in accordance with the increase of the current consumption, and a change arises in the reference voltage $V_{REF}$.

SUMMARY OF THE INVENTION

This invention is intended to solve these problems as stated above, and a primary object of the present invention is to provide a semiconductor integrated circuit in which a current consumption taken out from backup power supply is small even though load current limit function is removed.

Another object of the present invention is to provide a semiconductor integrated circuit which can operate stably, with high reliability.

Still another object of the present invention is to provide a semiconductor integrated circuit which has a simple circuit construction and a small chip size.

And still another object of the present invention is to provide a semiconductor integrated circuit in which an operational amplifier means with a load current limit function is not restricted for setting a reference voltage.

In order to accomplish the above objects, according to one aspect of the present invention, there is provided a semiconductor integrated circuit comprising a backup power supply means, an operational amplifier means for supplying a load with a load current from a power amplifier means and having a load current limit function for limiting the load current to provide an input stage with a negative feedback signal of a load current signal corresponding to the load current, and a load current limit function interruption means for interrupting the negative feedback operation of the operational amplifier means with a interruption signal of the load current limit function, wherein the operational amplifier means and the load current limit function interruption means are backed up by the backup power supply means, the load current limit function interruption means consists of a constant current circuit means for controlling interruption of the negative feedback operation to supply the operational amplifier with a constant current.

Since the interruption of feedback operation is controlled by providing the operational amplifier with a constant current, the invention is advantageous in that the current consumption supplied from the backup power supply can be made small in case of interruption of the load current limit operation.

In the above mentioned semiconductor integrated circuit, it is preferable that the constant current circuit means comprises a constant current source, a first current control circuit for receiving a current from the constant current source and outputting a current corresponding to the current that is provided from the constant current source in accordance with the interruption signal, a second current control circuit for receiving an output current from the first current control circuit and making stop the negative feedback operation by supplying the operational amplifier with a current corresponding to the output current.

In the above mentioned case, since the feedback operation is ceased by supplying current corresponding to the output current from the constant current source through the first current limit circuit and the second current limit circuit with the operational amplifier, the present invention is further advantageous in that the interrupt operation in the load current limit operation can be performed with high reliability in accordance with the constant current source.

In the above mentioned semiconductor integrated circuit, it is preferable that the output current from the second current control circuit is supplied to an active load in a differential amplifier which constitutes an input stage of the operational amplifier.

In the above mentioned case, since the feedback operation is ceased by supplying the active load in a differential amplifier which constitutes the input stage of the operational amplifier means with current corresponding to the output current from the constant current source, the invention is still further advantageous in that the operational amplifier means with the feedback current limit operation is not restricted for setting the reference voltage, the integrated circuit design becomes easy.

In the above mentioned semiconductor integrated circuit, it is preferable that the first current control circuit and said second current control circuit consist of current mirror circuits respectively.

In the above mentioned case, since each of the first current control circuit and the second current control circuit consists of current mirror circuit, the integrated circuit can provide the operational amplifier with a constant current equal to a output current from the constant current source, and thus, the present invention is still further advantageous in that an operation of the operational amplifier in case of interruption of the load current limit is to be stable, whereby a semiconductor integrated circuit is provided which has high reliability.

In the above mentioned semiconductor integrated circuit, it is preferable that the first current control circuit consists of a resistor and the second current control circuit consists of a current mirror circuit.

In the above mentioned case, since the first current control circuit consists of the resistor, the present invention is still further advantageous in that a circuit structure in the load current limit function interruption means becomes simple, and can be small in chip size.

In the above mentioned semiconductor integrated circuit, it is preferable that the current mirror circuit consisting of the second current control circuit has leakage cut resistor.

In the above mentioned case, since the current mirror circuit which constitutes the second current limit circuit has the leakage cut off resistor, the present invention is still further advantageous in that an integrated circuit with stable operation can be obtained.

In the above mentioned semiconductor integrated circuit, it is preferable that the the constant current circuit means comprises two constant current sources, an amplifier having these constant current sources respectively as loads connected to inputs of differential amplifier constituting an input stage in the operational amplifier, a current from one of the constant current sources is bypassed by said interruption signal from an amplifier which is said one of the constant current sources as a load to cease the feedback operation by making the input stage of the operational amplifier out of balance.

In the above mentioned case, since the current from one of two constant current sources is made bypass from the amplifier which has the one of constant current sources as a load, and the input amplifier means in the operational amplifier is made out of balance and cease the feedback operation, the present invention is still further advantageous in that the circuit operation before and/or after beginning of load current limit operation becomes stable.

In the above mentioned semiconductor integrated circuit wherein it is preferable that the output stage in the operational amplifier consists of power MOSFET.

In the above mentioned case, the present invention is still further advantageous in that a circuit structure for driving the output stage becomes simple, and chip size of the circuit can be small.

The other objects, features and advantages of the present invention will be apparent from the following description taken in conjunction with the accompanying drawings.

DETAILED DESCRIPTION OF THE PREFERRED EMBODIMENT

Hereinafter, a plurality of preferred embodiments of the invention will be described in connection with a squib driver circuit in which a P-channel power MOSFET drives a squib of air bag systems.

Preferred Embodiment 1

Figure 1:
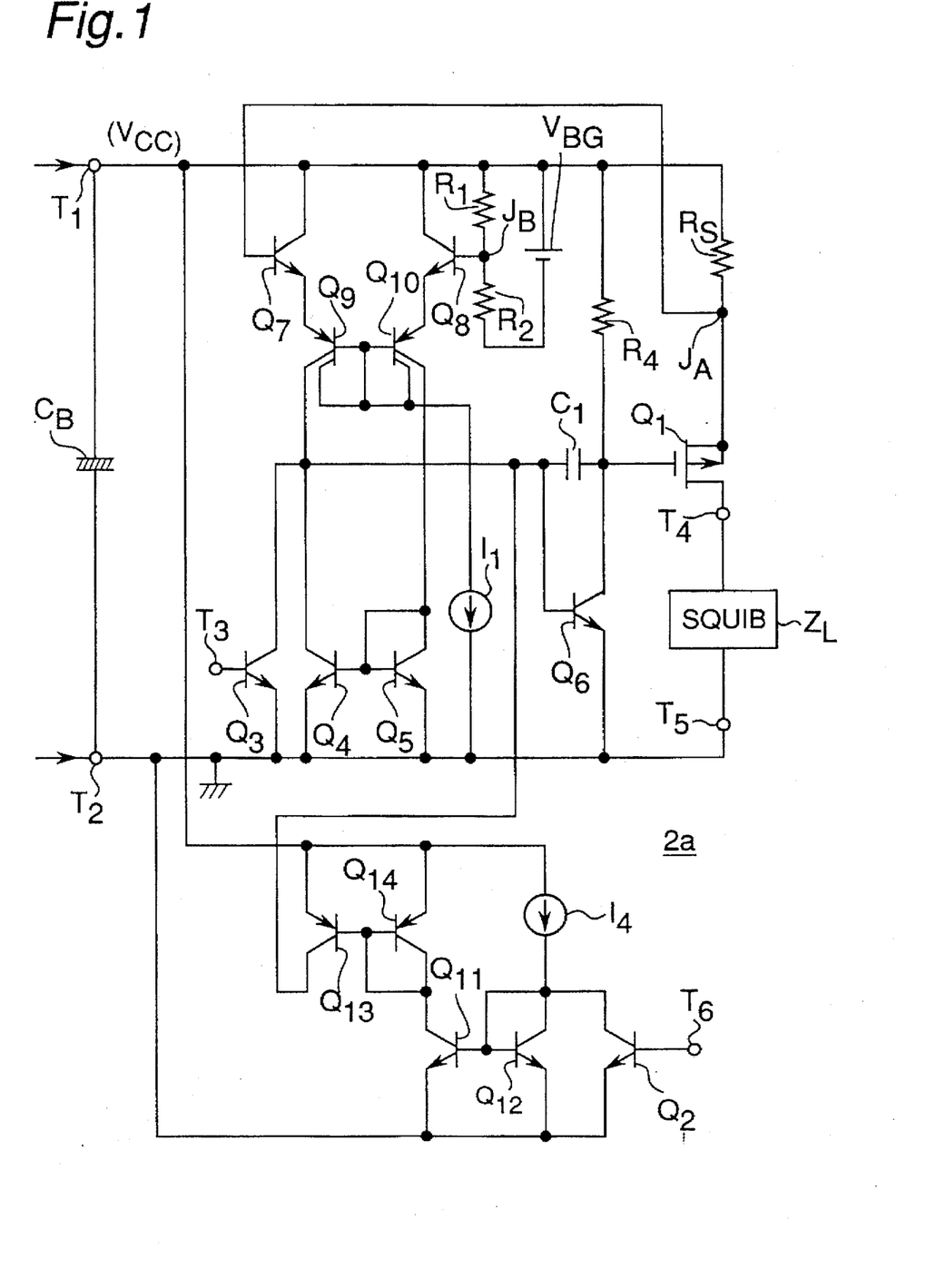
FIG. 1 is a circuit diagram of preferred embodiment 1 of the present invention.

In a squib driver circuit $2a$ shown in FIG. 1, a transistor $Q_1$ is a P-channel power MOSFET which controls a current supplied to squib $Z_L$. Transistors $Q_4$–$Q_{10}$ constitute an an operational amplifier together with a constant current source $I_1$, resistors $R_1$, $R_2$, $R_4$ and capacitor $C_1$. The transistor $Q_1$ constitutes a power amplifying stage in the operational amplifier. The transistor $Q_1$ has its gate connected to collector of the transistor $Q_6$ in the operational amplifier, and a shunt resistor $R_s$ is connected between source of the transistor $Q_1$ and the power supply $V_{CC}$. The squib $Z_L$ is connected between an output terminal $T_4$ connected to drain of the transistor $Q_1$ and another output terminal $T_5$ connected to the ground.

The transition $Q_7$ in the operational amplifier has its base connected to node $J_A$ between source of the transistor $Q_1$ and the shunt resistor $R_S$. The transistor $Q_8$ has its base connected to node $J_B$ between the resistors $R_1$ and $R_2$. These resistors $R_1$, $R_2$ are connected to power supply $V_{BG}$ in parallel. The transistor $Q_3$ has its collector connected to collector of the transistor $Q_4$ in the operational amplifier. The transistor $Q_3$ has its base connected to collision sense signal input terminal $T_3$, and its emitter connected to the ground.

Above described structure is the same as that of the squib driver circuit 2 described in FIG. 7. The squib driver circuit $2a$ in FIG. 1 further comprises constant current source $I_4$ and two current mirror circuits consisted of transistors $Q_{11}$–$Q_{14}$ as a load current interrupt function release means. The transistors $Q_{11}$ and $Q_{12}$ constitute a current mirror circuit. Each of the transistors $Q_{11}$, $Q_{12}$ has its emitter connected to the ground and bases of the transistors $Q_{11}$, $Q_{12}$ are connected each other. The current source $I_4$ is connected between collector of the transistor $Q_{12}$ and the power supply $V_{CC}$. The transistor $Q_{12}$ also has its collector connected to collector of the transistor $Q_2$. The transistor $Q_2$ has its emitter connected to the ground and its base connected to input terminal $T_6$ for controlling on/off of the current limitation.

The transistors $Q_{13}$, $Q_{14}$ constitute another current mirror circuit. Each of these transistors $Q_{13}$, $Q_{14}$ has its emitter connected to the power supply $V_{CC}$, bases of the transistors $Q_{13}$, $Q_{14}$ are connected each other. The transistor $Q_{12}$ has its collector connected to base in the transistor $Q_6$. The transistor $Q_{14}$ has its collector connected to collector of the transistor $Q_{11}$ and its base.

The squib driver circuit $2a$ operates as follows. That is, when the load current restriction function is needed, logical "H" inputs to the input terminal $T_6$ for said load current restriction function release signal. As a result, the transistor $Q_2$ is switched on, and the current from the constant current source $I_4$ is bypassed to the ground by the transistor $Q_2$, so that the transistor $Q_{13}$ is switched off. The circuit in FIG. 1 then performs the same load current restriction function as that of the circuit in FIG. 7.

On the other hand, when the load current restriction function is to be released, logical "L" inputs to the control signal input terminal $T_6$, and each of the two current mirror circuits which respectively consists of the transistors $Q_{11}$, $Q_{12}$ and the transistor $Q_{13}$, $Q_{14}$ is biased to operate. A current value in this case is determined in accordance with the constant current source $I_4$, if each emitter size of the pnp transistors $Q_{11}$, $Q_{12}$ is equal to each other and each collector length of the pnp transistors $Q_{13}$, $Q_{14}$ is equal to each other, collector current of transistor $Q_{13}$ becomes approximately equal to $I_4$.

The constant current source $I_4$ is then required that $(I_4-I_1)$ is sufficient to drive the transistor $Q_6$. In general, in case of $(I_4-I_1)=I_1$, that is, $I_4=2\times I_1$, the transistor $Q_{13}$ supplies current $2\times I_1$. Accordingly, in order to limit the load current, even if collector of the transistor $Q_4$ intends to draw in a maximum current (that is, $I_1$) in its ability, at least the transistor $Q_6$ is supplied at its base with a base current $I_1$, and thus, the load current restriction operation may be inhibited.

For example, in case of $V_{CC}=20$ V, $R_4=20$ kilo-ohms, the collector current in transistor $Q_6$ is about 1 mA. If a current amplification factor $h_{FE}$ in saturation of the transistor $Q_6$ is 10–20, the transistor $Q_6$ requires 50–100 μA for its base current, and therefore the currents $I_1$ and $I_4$ may be set as $I_1=50–100$ μA and $I_4=2\times I_1=100–200$ μA. That is, an increase in consumption current is only about 100–200 μA in the removal of the load current limit operation.

Accordingly, the squib driver circuit $2a$ in FIG. 1 has an advantage that the increase of the current consumption can be held down even if the load current limit operation is removed. Because the circuit $2a$ does not require the resistors $R_1$, $R_2$ which have large resistance as the squib driver circuit 2 in FIG. 7, its chip size can be made small, and the circuit $2a$ hold down the change of voltage $V_B$ (the reference voltage $V_{REF}$) on node $J_B$ based on the base current in transistor $Q_8$.

Preferred Embodiment 2

Figure 2:
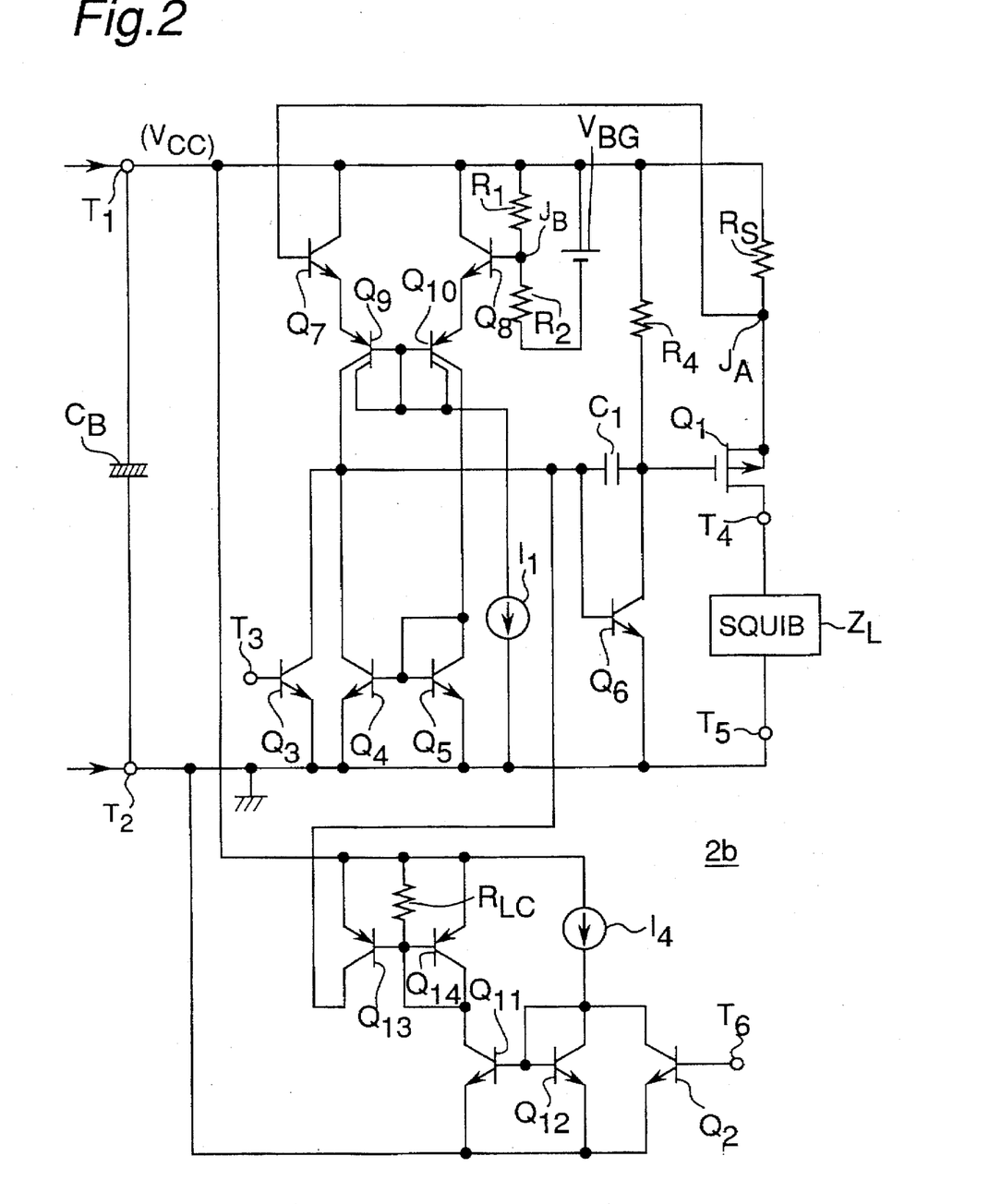
FIG. 2 is a circuit diagram of preferred embodiment 2 of the present invention.

A squib driver circuit $2b$ shown in FIG. 2 has a construction that current leakage cut off resistor $R_{LC}$ is connected between each base of the transistors $Q_{13}$, $Q_{14}$ constituting the current mirror circuit and the power supply $V_{CC}$ in the squib driving circuit $2a$ shown in FIG. 1.

When the transistor $Q_2$ is switched on, the transistor $Q_{11}$ is switched off, and the current leakage cut off resistor $R_{LC}$ is not present, base of the transistor $Q_{13}$ is substantially to be an open state, a leakage current (collector cut off current $I_{CEO}$) flows through the transistor $Q_{13}$. However, in this preferred embodiment shown in FIG. 2 even if the transistor $Q_2$ is switched on and the transistor $Q_{11}$ is switched off as stated above, the leakage current is held down since base of the pnp transistor $Q_{13}$ is connected to the power supply $V_{CC}$ through the resistor $R_{LC}$. Accordingly, the current consumption in the squib driver circuit $2b$ is held down to be smaller, and the circuit $2b$ can operate more stably.

Incidentally, in FIG. 2, the portions which correspond to ones in FIG. 1 are assigned the same reference numerals as ones of FIG. 1, and the descriptions of them will be omitted.

Preferred Embodiment 3

Figure 3:
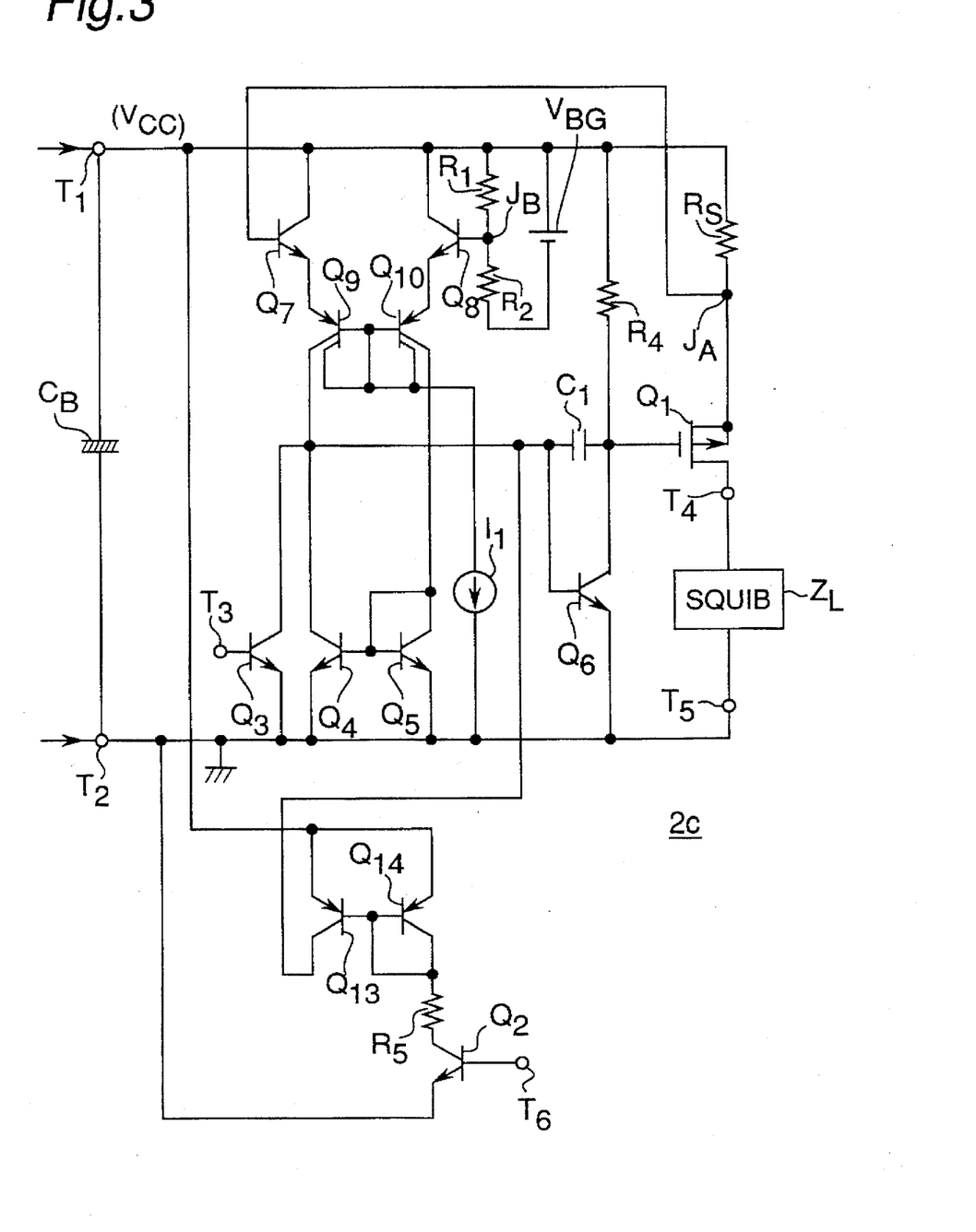
FIG. 3 is a circuit diagram of preferred embodiment 3 of the present invention.

A squib driver circuit $2c$ shown in FIG. 3 has a structure that resistor $R_5$ is used in place of the current mirror circuit which is made up of the transistors $Q_{11}$, $Q_{12}$ and the constant current source $I_4$ in the squib driver circuit $2a$ described in FIG. 1. The resistor $R_5$ is connected between collector of the transistor $Q_2$ and collector of the transistor $Q_{14}$. According to this constitution, the circuit structure of squib driver circuit $2c$ is to be more simple than the squib driver circuit $2a$ shown in FIG. 1. Incidentally, in FIG. 3, the portions which correspond to ones in FIG. 1 are assigned the same reference numerals as ones of FIG. 1, and the descriptions of them will be omitted.

Preferred Embodiment 4

Figure 4:
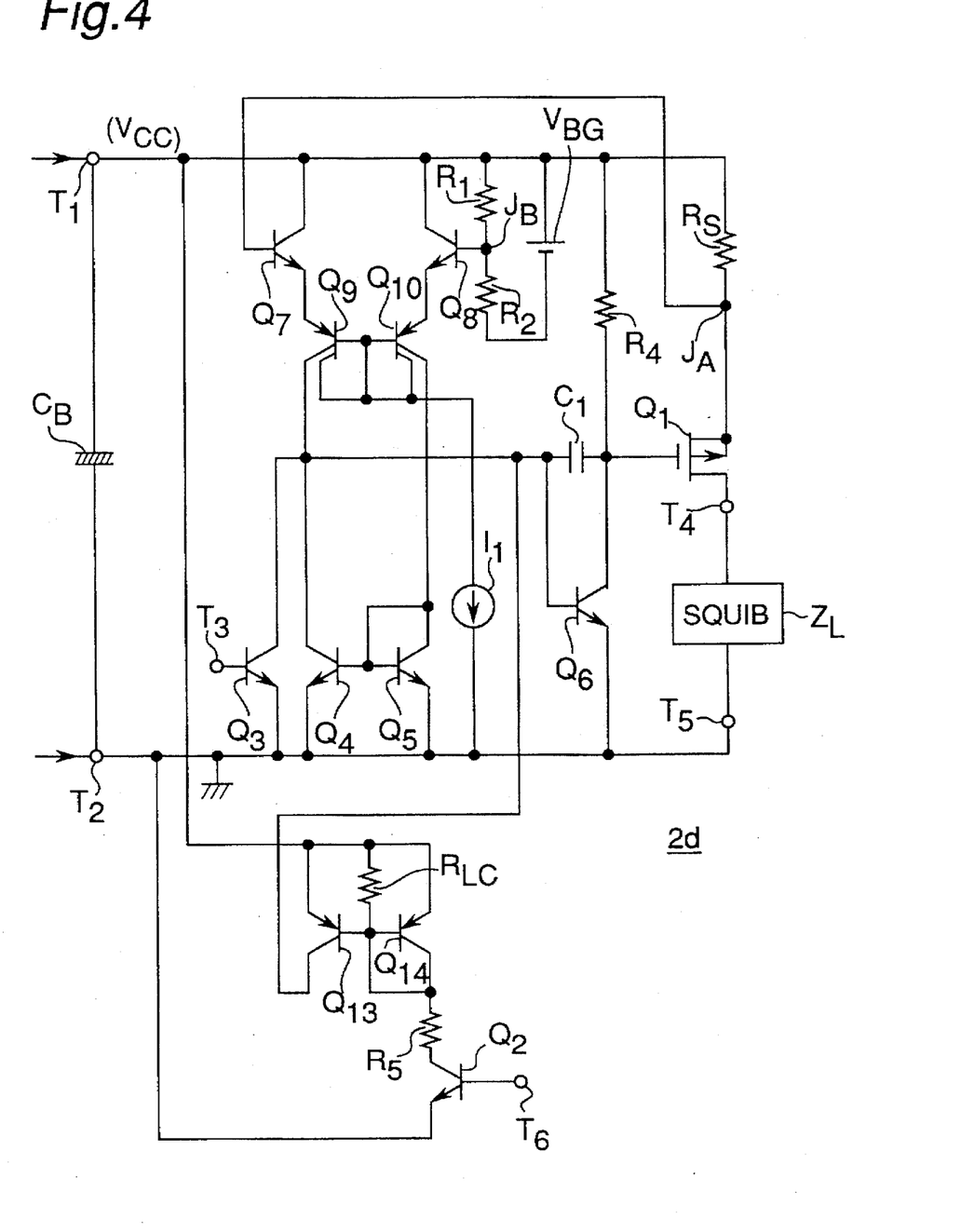
FIG. 4 is a circuit diagram of preferred embodiment 4 of the present invention.

A squib driver circuit $2d$ shown in FIG. 4 has a structure that the leakage cut off resistor $R_{LC}$ is connected in the same way as the preferred embodiment 2 between each base of transistors $Q_{13}$, $Q_{14}$ constituting the current mirror circuit and the power supply $V_{CC}$ in the squib driver circuit $2c$ described in FIG. 3.

According to this constitution, the circuit structure of squib driver circuit $2d$ is to be more simple and a current consumption is to be small. Incidentally, in FIG. 4 the portions which correspond to ones in FIG. 3 are assigned the same reference numerals as ones of FIG. 3, and the description of those portions will be omitted.

Preferred Embodiment 5

Figure 5:
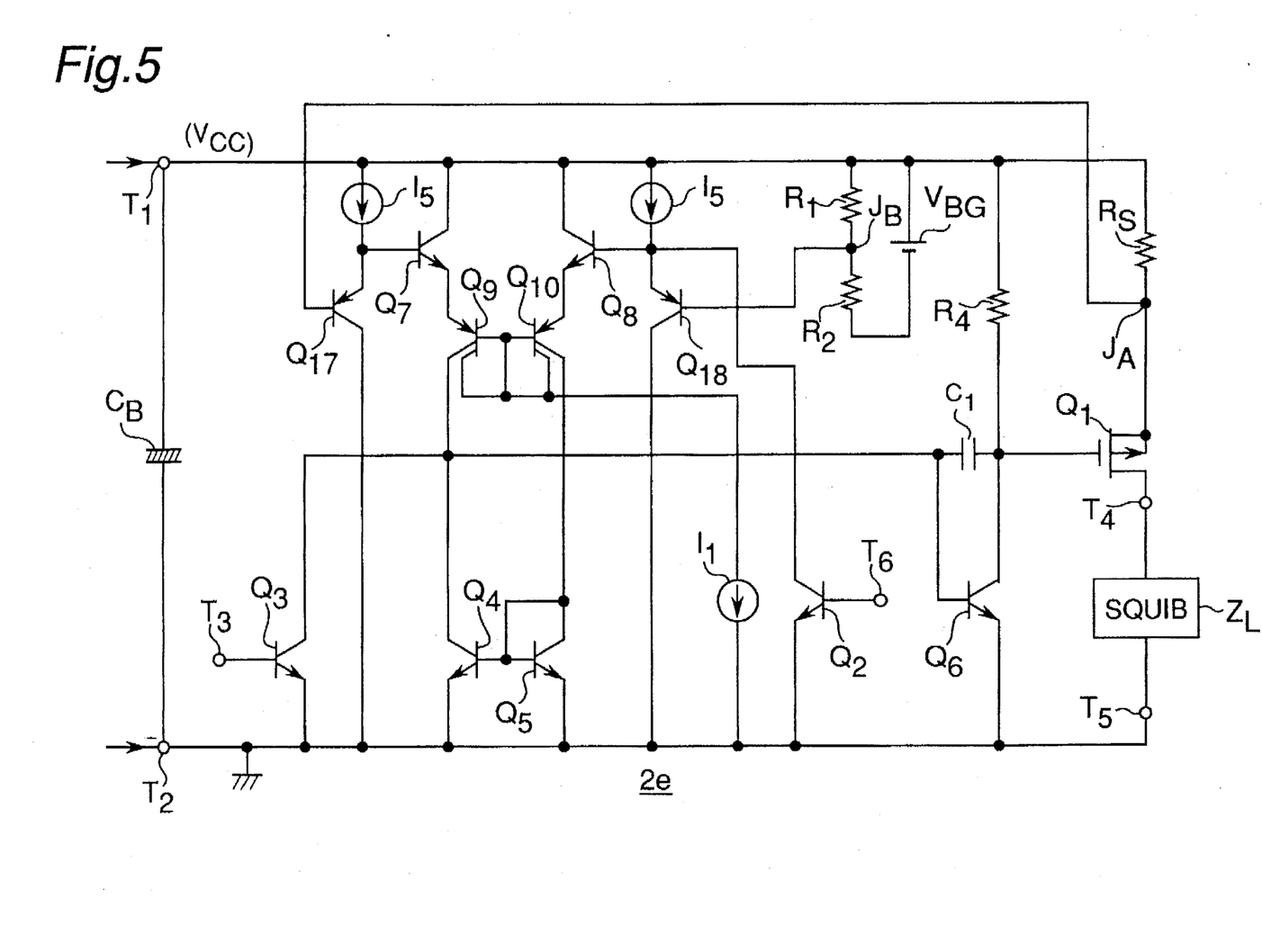
FIG. 5 is a circuit diagram of preferred embodiment 5 of the present invention.

A squib driver circuit $2e$ shown in FIG. 5 has transistors $Q_{17}$, $Q_{18}$ and two constant current sources $I_5$, $I_5$ connected as follows in place of the current mirror circuit consisting of transistors $Q_{11}$–$Q_{14}$ and the current source $I_4$ in the squib driver circuit $2a$ described in FIG. 1. The transistor $Q_{17}$ has its emitter connected to base of transistor $Q_7$, its base connected to the node $J_A$, and its collector connected to the ground. A constant current source $I_5$ is connected between emitter of the transistor $Q_{17}$ and the power supply $V_{CC}$. The transistor $Q_{18}$ has its emitter connected to base of the transistor $Q_8$, its base connected to the node $J_B$, and its collector connected to the ground. Another constant current source $I_5$ is connected between emitter of the transistor $Q_{18}$ and the power supply $V_{CC}$. The emitter of the transistor $Q_{18}$ is connected to collector of the transistor $Q_2$. The transistor $Q_2$ has its emitter connected to the ground, and its base connected to the control signal input terminal $T_6$.

Because other remaining constitutions of the connections for transistor $Q_1$, transistors $Q_3$–$Q_{10}$, capacitor $C_1$ and resistors $R_1$, $R_2$ etc. have the same constitutions as that of the squib driver circuit $2a$ in FIG. 1, the portions which correspond to ones in FIG. 1 are assigned the same reference numerals as ones of FIG. 1, and the description of these portions will be omitted.

The squib driver circuit $2e$ not only has an advantage according to the prior art squib driver circuit 2 described in FIG. 7 that the base current in the transistor $Q_6$ does not change before and/or after the removal of the current restriction, but also has a circuit structure which holds down the current consumption.

The operation in the squib driving circuit is as follows. Even if the removal signal input terminal $T_6$ for load current restriction operation is turned to logical "H" and the transistor $Q_2$ is switched on, current does not flow through the transistor $Q_8$, and only current from the constant current source $I_5$ is supplied to the transistor $Q_2$. Accordingly, even if said transistor is switched on, the increase of the current consumption is held down, base current in the transistor $Q_6$ does not change before and/or after the removal of the current restriction operation.

However, said squib driver circuit $2e$ is limited as follows in setting the potential on node $J_B$:

potential on $J_B < V_{CC} - V_{BE}(Q_{18}) - V(I_5)$ min., provided that $V(I_5)$ min. is a minimum voltage required to constitute the constant current source $I_5$.

For example, if the constant current source $I_5$ is constituted with a pnp transistor, at least 0.4 V is to be needed for the $V(I_5)$ min., if $V_{BE}(Q_{18})=0.6$, then the potential on node $J_B=(V_{CC}-1)$ volt(s). Because of this, the resistance of shunt resistance $R_S$ is determined.

Although, the present invention has been described in terms of preferred embodiments, it will be apparent to those of skill in the art that numerous variations and modifications may be made without departing from the true spirit and scope thereof, as set forth in the following claims.

What is claimed is:

1. A semiconductor integrated circuit comprising
    a backup power supply means,
    an operational amplifier means for supplying a load with a load current from a power amplifier means and having a load current limit function for limiting the load current to provide an input stage with a negative feedback signal of a load current signal corresponding to the load current, and a load current limit function interruption means for interrupting the negative feedback operation of the operational amplifier means with an interrupting signal of the load current limit function, wherein the operational amplifier means and the load current limit function interruption means are backed up by the backup power supply means, the load current limit function interruption means consists of a constant current circuit means for controlling interruption of the negative feedback operation to supply the operational amplifier with a constant current.

2. The semiconductor integrated circuit according to claim 1, wherein said constant current circuit means comprises a constant current source, a first current control circuit for receiving a current from the constant current source and outputting a current corresponding to the current provided from the constant current source in accordance with the interruption signal, a second current control circuit for receiving an output current from the first current control circuit and making the negative feedback operation stop by supplying the operational amplifier with a current corresponding to the output current.

3. The semiconductor integrated circuit according to claim 2, wherein said output current from the second current control circuit is supplied to an active load in a differential amplifier which constitutes an input stage of the operational amplifier.

4. The semiconductor integrated circuit according to claim 3, wherein said first current control circuit and said second current control circuit consist of current mirror circuits respectively.

5. The semiconductor integrated circuit according to claim 4, wherein said current mirror circuit consisting of the second current control circuit has a leakage cut resistor.

6. The semiconductor integrated circuit according to claim 2, wherein said first current control circuit and said second current control circuit consist of current mirror circuits respectively.

7. The semiconductor integrated circuit according to claim 6, wherein said current mirror circuit consisting of the second current control circuit has a leakage cut resistor.

8. The semiconductor integrated circuit according to claim 2, wherein said first current control circuit consists of a resistor and said second current control circuit consists of a current mirror circuit.

9. The semiconductor integrated circuit according to claim 8, wherein said current mirror circuit consisting of the second current control circuit has a leakage cut resistor.

10. The semiconductor integrated circuit according to claim 3, wherein said first current control circuit consists of a resistor and said second current control circuit consists of a current mirror circuit.

11. The semiconductor integrated circuit according to claim 10, wherein said current mirror circuit consisting of the second current control circuit has a leakage cut resistor.

12. The semiconductor integrated circuit according to claim 2, wherein said current mirror circuit consisting of the second current control circuit has a leakage cut resistor.

13. The semiconductor integrated circuit according to claim 1, wherein said constant current circuit means comprises two constant current sources, an amplifier having these constant current sources respectively as loads connected to inputs of differential amplifier constituting an input stage in the operational amplifier, a current from one of the constant current sources is bypassed by said interruption signal from an amplifier which is said one of the constant current sources as a load to cease the feedback operation by making the input stage of the operational amplifier out of balance.

14. The semiconductor integrated circuit according to claim 1, wherein said output stage in the operational amplifier consists of a power MOSFET.

* * * * *